United States Patent
Geisler

[19]

[11] Patent Number: 5,992,302
[45] Date of Patent: Nov. 30, 1999

[54] FOOD COOKING APPARATUS WITH DIRECT FOOD TEMPERATURE SENSING

[75] Inventor: Clifton F. Geisler, Edmond, Okla.

[73] Assignee: Trustees of America's Drive-In Trust, Reno, Nev.

[21] Appl. No.: 08/969,199

[22] Filed: Nov. 12, 1997

[51] Int. Cl.⁶ .............................. A47J 37/06; A47J 43/18; A23L 37/10
[52] U.S. Cl. ........................... 99/343; 99/349; 99/421 V; 99/421 A
[58] Field of Search .............................. 99/342, 343, 349, 99/419, 421 A, 421 V, 447

[56] References Cited

U.S. PATENT DOCUMENTS

| | | | |
|---|---|---|---|
| 4,141,239 | 2/1979 | Gilbert | 99/342 X |
| 4,170,933 | 10/1979 | Meamber | 99/349 |
| 4,217,817 | 8/1980 | Meamber | 99/349 |
| 4,246,834 | 1/1981 | Brown | 99/334 |
| 4,635,538 | 1/1987 | Polster | 99/349 |
| 4,702,159 | 10/1987 | Polster | 99/349 |
| 4,729,296 | 3/1988 | Sabin | 99/349 |
| 5,082,678 | 1/1992 | Margolis | 426/281 |
| 5,397,585 | 3/1995 | Abernathy | 426/417 |
| 5,549,040 | 8/1996 | Naramura | 99/349 |
| 5,622,137 | 4/1997 | Lupton, Jr. et al. | 116/217 |
| 5,712,466 | 1/1998 | Spicer | 99/349 X |

*Primary Examiner*—Reginald L. Alexander
*Attorney, Agent, or Firm*—Crowe & Dunlevy

[57] ABSTRACT

A cover adapted to overlie a food item to be cooked beneath the support, such as on a griddle or grill, carries at least one temperature sensor disposed on the cover to sense an actual temperature of the food item being cooked. An indicator is mounted on the cover and connected to the temperature sensor. There is preferably a respective indicator for each temperature sensor, or at least for each respective food item that can be cooked at one time using the apparatus of the present invention. In a specific implementation, the cover includes a hamburger press and the temperature sensor is mounted on the hamburger press to penetrate a hamburger patty beneath the press so that the internal temperature of the patty is sensed.

12 Claims, 1 Drawing Sheet

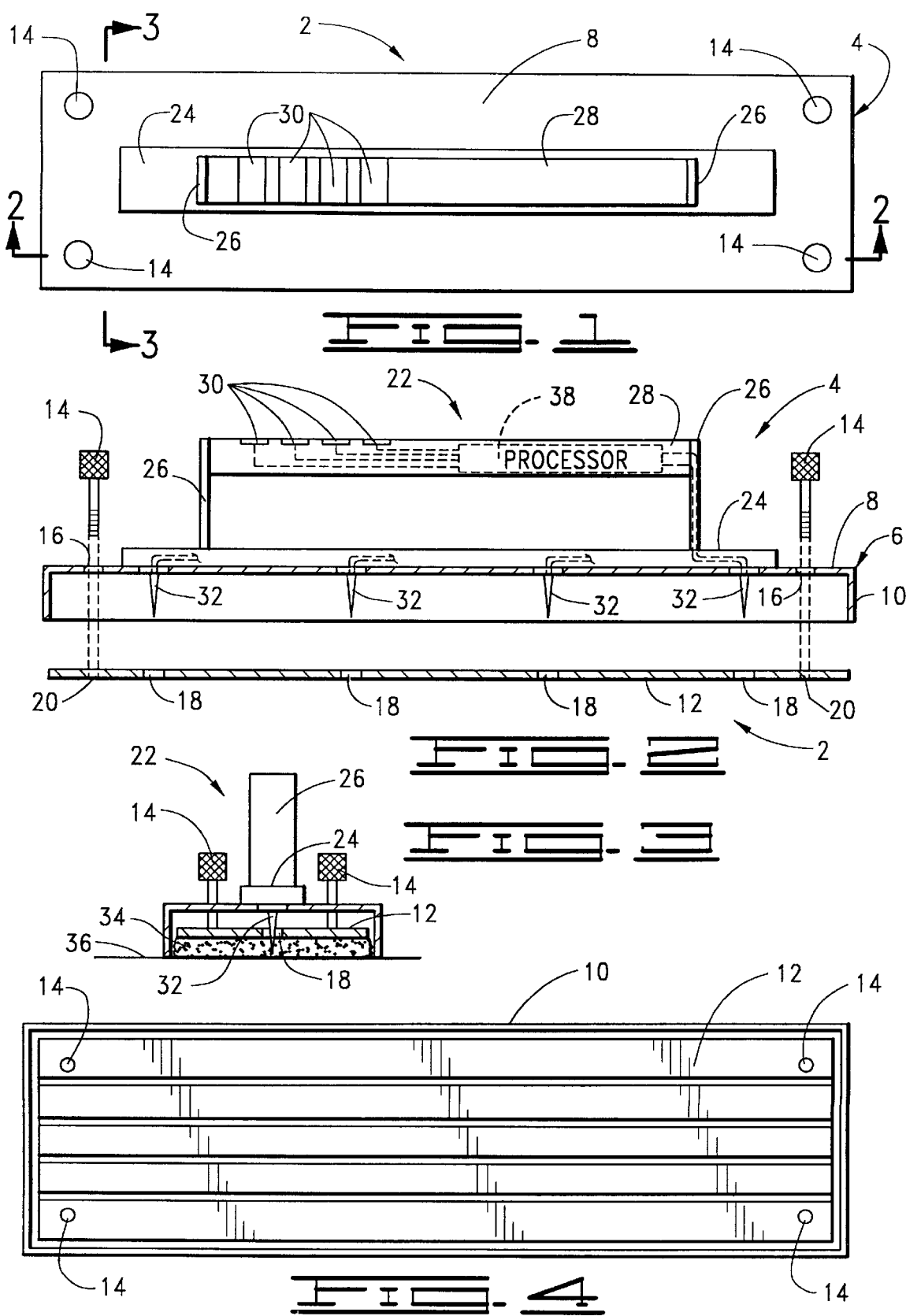

FOOD COOKING APPARATUS WITH DIRECT FOOD TEMPERATURE SENSING

BACKGROUND OF THE INVENTION

This invention relates generally to temperature sensing food cooking apparatus. In a preferred embodiment, the present invention is a portable hamburger press with one or more temperature probes to sense internal temperatures of hamburger patties as the patties are being cooked.

Food safety is an important issue to both the food service industry and consumers. This is especially true with regard to ground beef products, such as hamburgers, which can contain active pathogens if not adequately cooked. To ensure that a hamburger patty, for example, has been adequately cooked would require sensing the internal temperature of the patty and cooking it until a known safe temperature (e.g., 165° F.) is sensed.

Although the issues of food safety and safe cooking temperatures have been known, it has been cost prohibitive and operationally infeasible to measure each and every patty's internal temperature directly. Consequently, food service industry attempts to assure ground beef food safety have focused on controlling the relationship between cooking temperature and time because this has been perceived to be more operationally compatible. This approach attempts to provide a statistical assurance that if one cooks ground beef at a certain temperature for long enough, proper internal temperatures will be obtained. This relies on statistical averages rather than on actual direct measurement of food item temperature for each food item cooked.

Because of the inevitable variations in patty composition and cooking temperatures, the aforementioned indirect approach cannot assure that each and every patty will obtain the proper internal temperature. One attempt to overcome this shortcoming is for restaurants to overcook their products to try to assure reaching safe internal temperatures. Overcooking has its own shortcomings in that customers typically do not prefer overcooked food.

To avoid having to overcook and yet to ensure adequately cooked food, there is the need for an improved food cooking apparatus which enables direct sensing of internal food temperature without being cost prohibitive or operationally infeasible.

SUMMARY OF THE INVENTION

The present invention overcomes the above-noted and other shortcomings of the prior art, and satisfies the aforementioned need, by providing a novel and improved food cooking apparatus, particularly one which enables the sensing of temperature inside food items as they are being cooked.

The present invention directly senses actual food item temperature (as opposed to, for example, ambient air temperature or griddle temperature) and indicates when a desired temperature is reached. The sensing and indicating functions are integrated into one apparatus in the preferred embodiment of the present invention, and respective sensing and indicating are provided for each food item cooked using the apparatus of the preferred embodiment. Additionally, the preferred embodiment accommodates irregular shrinkage of individual food items.

The present invention enables expedited food production while assuring product quality, including that it is safe for human consumption.

The food cooking apparatus of the present invention comprises a cover adapted to overlie a food item to be cooked beneath the cover. The apparatus also comprises a temperature sensor connected to the cover to sense an actual temperature of the food item being cooked.

Stated another way, the present invention provides an apparatus to aid in cooking a food item on a griddle or grill. This apparatus comprises means for sensing temperature. It also comprises means for covering the food item on the griddle or grill and for supporting the temperature sensing means such that at least a portion of the temperature sensing means touches the food item in response to moving the covering and supporting means to an operating position relative to the griddle or grill on which the food item is placed.

In a particular embodiment, the aforementioned covering and supporting means includes a portable hamburger press sized to overlie one or more hamburger patties placed on the griddle or grill. In this embodiment, the temperature sensing means includes one or more temperature probes at least equal in number to the number of hamburger patties the hamburger press is sized to overlie. Each such temperature probe is disposed on the hamburger press so that the respective temperature probe penetrates a respective hamburger patty at a spot inward of the perimeter (preferably in the center) of the respective hamburger patty to sense internal temperature of such hamburger patty when the apparatus is used with the hamburger patty. The hamburger press of this embodiment also preferably includes a press plate adapted to allow each hamburger patty, during cooking, to shrink from the perimeter of the hamburger patty toward the center of the hamburger patty.

The apparatus of the present invention further comprises an indicator mounted on the cover and connected to a respective temperature sensor. For example, the indicator can be mounted on a handle of the aforementioned hamburger press. There is preferably a respective indicator for each temperature sensor (or at least for each respective food item that can be cooked at one time using the apparatus of the present invention).

Therefore, from the foregoing, it is a general object of the present invention to provide a novel and improved food cooking apparatus, particularly one which enables the sensing of temperature inside food items as they are being cooked. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a top view of a preferred embodiment of the food cooking apparatus of the present invention.

FIG. 2 is a side view, partially in section and partially exploded, of the apparatus of FIG. 1 as taken along line 2—2 in FIG. 1.

FIG. 3 is an end view, partially in section, of the apparatus of FIG. 1 as taken along line 3—3 in FIG. 1 and illustrating use with a hamburger patty.

FIG. 4 is a bottom view of the apparatus of FIG. 1.

DETAILED DESCRIPTION OF THE INVENTION

The preferred embodiment of a food cooking apparatus 2 in accordance with the present invention will be described with reference to FIGS. 1–4. The apparatus 2 aids in cooking a food item on a cooking surface, such as a conventional griddle or grill used at a restaurant, for example. Non-limiting examples of food items include chicken fillets, steaks, and bacon; however, the preferred embodiment is particularly suited for hamburger patties (either frozen or not).

The food cooking apparatus 2 includes a cover 4 adapted to overlie, and preferably enclose, the food item (or items) to be cooked beneath the cover 4. The cover 4 specifically includes a meat press such as a portable hamburger press sized to overlie and enclose one or more hamburger patties placed on a griddle or grill for cooking. Although the illustrated preferred embodiment is free-standing and portable, the food cooking apparatus of the present invention can be configured to be pivotally, or otherwise movably, mounted to a wall or to a side of the griddle or grill.

The hamburger press implementing the cover 4 in FIGS. 1–4 includes a body 6. The body 6 has a top wall 8 below which a side wall skirt 10 extends around the perimeter of the top wall 8. In the illustrated embodiment, the top wall 8 is rectangular and the skirt 10 extends along the four edges of the wall. The length and width of the top wall 8 preferably are such that the top wall 8 overlies all the food items for which the particular press is designed to accommodate at one time and further such that the depending skirt 10 does not engage the food items but encloses them and sits on the griddle or grill when the apparatus 2 is used. In a particular implementation, the size of the top wall 8 accommodates four premanufactured hamburger patties each having a maximum diameter of about five inches. The top wall 8 and the skirt 10 are made in a conventional manner using conventional material suitable for use in food preparation (e.g., stainless steel).

The hamburger press implementing the cover 4 also includes a press member 12 disposed above the food item when the food item and the press are placed on the cooking surface to cook the food item. The member 12 is disposed within the cavity of the body 6 defined by the top wall 8 and the skirt 10. The press member 12 and the body 6 are movable relative to each other. In the illustrated embodiment, the press member 12 is retained by four threaded fasteners 14 which have shanks of smaller diameter than receiving holes 16 defined in the top wall 8 so that the shanks can move relative to the holes 16 and thus the press member 12 can move relative to the body 6.

As shown in the drawings, the member 12 has a plurality of apertures 18 defined through it. These are located so that the apertures 18 are substantially centered over respective hamburger patties located beneath the press member 12 when the food cooking apparatus 2 is used. The purpose of these apertures will be explained below.

The press member 12 also includes threaded openings 20 which receive the threaded ends of the fasteners 14 so that the member 12 and the fasteners 14 are thereby connected.

Although the press member 12 can be any suitable element for implementing the foregoing, in the illustrated embodiment the member 12 is a 3.18-pound flat rectangular ¼-inch thick aluminum floating press plate having longitudinal channels or grooves (FIG. 4). This configuration, specifically the weight (which is about thirty percent less than a conventional press plate), adapts the press member 12 to provide a relatively lighter downward force on the food items and thereby allow each of the food items, during cooking, to shrink from its perimeter toward its center rather than from its center toward its perimeter. If the press member 12 were too heavy, shrinking would occur from the center toward the perimeter which could cause interior thinning of the food item, or even holes, that would prevent the temperature sensor from properly contacting the food item, thereby resulting in inaccurate temperature sensing. Regarding the grooves, these are a conventional feature to prevent suction between the plate and the food item and to allow liquids to run off. Grooves can be on both sides of the press member 12 so that the member 12 can be turned over if needed.

The thickness of the press member 12 and the height of the skirt 10 of the body 6 are selected such that they accommodate the thickness of the food items for which a particular implementation of the food cooking apparatus 2 is intended. As is apparent from the drawings, the press member 12 will abut the food items (i.e., hamburger patties in the illustration) and thus be moved farther into (upwardly as viewed in FIG. 2) the cavity in the body 6 when the apparatus 2 is placed over the food items and the bottom edge of the skirt 10 is on a griddle or grill.

The hamburger press implementing the cover 4 still further includes a handle 22. The handle 22 has a base 24 connected in any suitable manner (e.g., by releasable fasteners such as screws) on the outer surface of the top wall 8. Connected in any suitable manner (e.g., by screws or by screwing into the base) to the base 24 are two handle element retainers 26. The base 24 and the handle element retainers 26 are made of any suitable material, which in a particular implementation is stainless steel. The handle 22 further includes an elongated hollow handle element 28 connected at its ends to the handle element retainers 26. The handle element 28 is made of a thermally and electrically insulative material which does not become too hot for a human to grip when the food cooking apparatus 2 is used. In a particular implementation, the handle element material includes ABS resin.

The handle 22, and particularly the handle element 28 in the illustrated embodiment, houses one or more temperature display indicators 30 forming another part of the food cooking apparatus 2 of the present invention. The indicator or indicators 30 are of any type suitable for alerting a cook that a desired temperature has been reached in the cooking process. Examples include visual indicators, such as lights or numerical readouts, and audible indicators, such as buzzers. Four indicator lights recessed in the handle element 28 are shown implementing the indicators 30 of the illustrated embodiment. These indicators are mounted on the cover 4, such as just described, and are connected to temperature sensors 32 forming another part of the food cooking apparatus 2 of the present invention.

Each temperature sensor 32 is disposed on the cover 4 to sense an actual temperature of the food item being cooked. In the illustrated embodiment, each sensor 32 has an elongated probe that is connected at one end to the top wall 8 (and possibly also the base 24 of the handle 22). The connected end of the probe is preferably threadedly or otherwise releasably connected so that the sensor 32 can be easily removed and replaced. The other end of the probe extends through a respective one of the apertures 18 in the press member 12.

As shown in FIG. 3, a respective temperature sensor 32 is disposed on the hamburger press such that the lower end of the temperature sensor extends through the respective aperture 18 of the press member 12 and below the press member 12 into engagement with the food item (a hamburger patty 34 on a griddle 36 in FIG. 3) to sense temperature of the food item directly. Preferably, the temperature sensor probe penetrates into the food item to sense internal temperature of the food item when the food cooking apparatus 2 is placed on the food item. This can occur even with frozen items due to the weight of the apparatus 2 (and, depending upon how solid the frozen item is, also due to thawing as the item is cooked). In the illustrated embodiment, penetration occurs from above in a direction perpendicular to the main plane of the food item. To enable this to occur, the length of the probe of the temperature sensor 32 has an appropriate relationship to the height of the skirt 10 such that when the skirt rests on the griddle or grill with the food item or items within the cavity of the body 6, the temperature sensitive tip of the respective probe is inside the respective food item. With regard to lateral disposition of the temperature sensors 32, each temperature probe is disposed on the cover 4 so that the respective temperature probe penetrates a respective food item (hamburger patty for the illustrated example) at a spot inward of the perimeter of the respective food item. Preferably, each such temperature probe is substantially centered on its respective food item.

In the preferred embodiment, there is at least one temperature sensor for each food item cooked beneath the cover 4. For the illustrated embodiment, there are one or more temperature probes at least equal in number to the number of hamburger patties the hamburger press is sized to overlie. Four are shown in the particular illustrated implementation so that this implementation accommodates up to four food items. These temperature sensors 32 are spaced from each other so that they engage desired locations on their respective food items, such as the center thereof, as described above.

As previously mentioned, the temperature sensors 32 preferably are removable so they can be replaced. This can include providing a plug-in receptacle as part of the connector. The plug makes electrical contact between the temperature responsive element of the sensor 32 and wires or other electrical conductors extending from the plug to an electronic circuit housed within the hollow of the handle element 28. The respective conductors for a respective temperature sensor 32 can extend from the respective plug at the sensor attachment location through a channel in the base 24 and a passageway in one of the handle element retainers 26. One such arrangement is illustrated in FIG. 2.

The ends of the conductors that extend into the handle element 28 connect to an electrical circuit that responds to the temperature sensing of the temperature sensor 32 and controls the indicators 30. In view of this processing function, the circuit is generally identified in FIG. 2 as a processor circuit 38. As a more specific example, the electrical circuit can include a programmed microprocessor that reads the output of the sensors 32, converts as needed for processing (e.g., convert to numerical data for numerical readout or compare to a predetermined level defining a safe internal temperature), and sends signals to the indicators. In a particular implementation, the electrical circuit electrically compares the temperature responses of the sensors 32 to a predetermined value representing a safe internal temperature (e.g., 165° F. for hamburger patties) and turns on the respective indicator lights 30 when the predetermined value is exceeded by the respective sensed temperatures. The electrical circuit can perform other functions as needed (e.g., sensor calibration). The electrical circuit is preferably energized by an on-board energy source, such as a battery (e.g., a 9-volt battery) carried inside the handle element 28. Any suitable type of electrical circuit can be used, whether analog or digital, discrete or integrated, as readily known in the art.

The foregoing exemplify means for sensing temperature and means for covering the food item on the griddle or grill and for supporting the temperature sensing means such that at least a portion of the temperature sensing means touches the food item in response to moving the covering and supporting means to an operating position relative to the griddle or grill on which the food item is placed.

To use the present invention illustrated in the drawings, the electric circuit is energized such as by actuating a power on/off switch (not shown) located on the handle element 28 and associated with the on-board battery. Either before or after the foregoing, the apparatus 2 is placed on the griddle or grill so that the press member 12 lies on the griddle surface and is heated. Once the press member 12 is properly heated, the apparatus 2 is lifted and placed over as many as four meat patties for the illustrated embodiment. As the apparatus 2 is placed to overlie the patties, the underside press member 12 is lifted by the thickness of patties sufficiently to pass the lower ends of the four internal temperature probes 32 centered on each patty. The weight of the overall press forces the sensors 32 into the center of each patty to sense the internal temperature. These probes thereby monitor each patty's internal temperature, and the indicators 30 are controlled in response to notify the cook when each patty either reaches the predetermined temperature (e.g., 165° F.) or reaches an internal temperature at which the patty can be flipped for the final cooking/holding process. When all the patties are at the appropriate temperature, the apparatus 2 is lifted and the patties are served or flipped as appropriate.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A food cooking apparatus to aid in cooking a food item on a cooking surface, comprising:

a cover member disposed above the food item when the food item is placed on the cooking surface to cook the food item, the cover member having a body;

a temperature sensor disposed on the cover member such that the weight of the cover member causes an end of the temperature sensor to extend to a predetermined distance above the cooking surface and into penetrating engagement with the food item to directly sense the internal temperature of the food item; and a press member disposed within the body of the cover member, whereby the press member and the body are moveable relative to each other.

2. The food cooking apparatus of claim 1, wherein the temperature sensor is connected to the body of the cover member and the end of the temperature sensor extends through an opening defined in the press member.

3. The food cooking apparatus of claim 2, wherein the press member is adapted to allow the food item, during cooking, to shrink from the perimeter of the food item toward the center of the food item.

4. The food cooking apparatus of claim 3, further comprising a temperature indicator mounted on the cover member and connected to the temperature sensor.

5. The food cooking apparatus of claim 4, wherein the cover member further includes a handle and further wherein the temperature indicator is mounted on the handle.

6. The food cooking apparatus of claim 1, further comprising a temperature indicator mounted on the cover member and connected to the temperature sensor.

7. The food cooking apparatus of claim 1, wherein the cover member is adapted to overlie a plurality of food items to be cooked beneath the cover member and wherein the apparatus comprises:

additional temperature sensors such that there is at least one temperature sensor for each food item cooked beneath the cover member.

8. A food cooking apparatus for cooking a food item on a cooking surface, comprising:

a cover member adapted to overlie the food item to be cooked on the cooking surface; and a temperature sensor connected to the cover member to sense and indicate an internal temperature of the food item being cooked, the temperature sensor comprising:

a sensor probe supported by the cover at a predetermined distance above the cooking surface and pressed into penetrating engagement with the food item to sense the internal temperature of the food item during cooking; and a temperature display indicator connected to the sensor probe to indicate the internal temperature sensed by the sensor probe; and a press member movably supported by the cover member and disposed on the food item being cooked.

9. The food cooking apparatus of claim 8, wherein the press member has an opening through which the sensor probe extends.

10. The food cooking apparatus of claim 9 wherein the weight of the press member is determined to provide a downward force on the food item to permit the food item to shrink from the perimeter thereof toward the center thereof during cooking.

11. The food cooking apparatus of claim 10 wherein the cover member includes a handle and further wherein the temperature display indicator is mounted on the handle.

12. The food cooking apparatus of claim 11 wherein the cover member is adapted to overlie a plurality of food items to be cooked beneath the cover member, and wherein the food cooking apparatus comprises additional temperature sensors such that there is at least one temperature sensor for each food item cooked beneath the cover member.

* * * * *